US010128767B1

United States Patent
Kim et al.

(10) Patent No.: US 10,128,767 B1
(45) Date of Patent: Nov. 13, 2018

(54) DC-DC CONVERTER SYSTEM FOR BLOCKING REVERSE POWERING

(71) Applicants: Hyundai Motor Company, Seoul (KR); Kia Motors Corporation, Seoul (KR)

(72) Inventors: Jee Heon Kim, Gyeonggi-do (KR); Mu Shin Kwak, Gyeonggi-do (KR); Dong Jun Lee, Gyeonggi-do (KR); Na Lae Kwon, Seoul (KR); Hyun Wook Seong, Gyeonggi-do (KR); Won Kyoung Choi, Gyeonggi-do (KR); Ho Joong Lee, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/809,453

(22) Filed: Nov. 10, 2017

(30) Foreign Application Priority Data

Jun. 7, 2017 (KR) .................. 10-2017-0070915

(51) Int. Cl.
*H02M 3/335* (2006.01)
*H02M 1/32* (2007.01)

(52) U.S. Cl.
CPC ......... *H02M 3/33592* (2013.01); *H02M 1/32* (2013.01)

(58) Field of Classification Search
CPC .................. H02M 3/33592; H02M 1/32
See application file for complete search history.

(56) References Cited

U.S. PATENT DOCUMENTS

| | | | |
|---|---|---|---|
| 2010/0172157 A1 | 7/2010 | Chen et al. | |
| 2011/0096578 A1 | 4/2011 | Fang et al. | |
| 2015/0023062 A1* | 1/2015 | Hyugaji | H02M 3/33592 363/16 |
| 2015/0049529 A1* | 2/2015 | Iorio | H02M 3/33507 363/89 |
| 2017/0085188 A1* | 3/2017 | Foresta | H02M 3/33546 |
| 2017/0155329 A1 | 6/2017 | Kim et al. | |

FOREIGN PATENT DOCUMENTS

KR 10-2011-0072013 A 6/2011

OTHER PUBLICATIONS

Extended European Search Report for European Patent Application No. 17202675.9, dated Jun. 12, 2018, 10 pages.
"Implementation of Logic Gates Using MUX", Explore Roots, dated May 6, 2018, 2 pages.

* cited by examiner

*Primary Examiner* — Jue Zhang
*Assistant Examiner* — Lakaisha Jackson
(74) *Attorney, Agent, or Firm* — Mintz Levin Cohn Ferris Glovsky and Popeo, P.C.; Peter F. Corless

(57) ABSTRACT

ADC-DC converter system is provided. The DC-DC converter system includes a transformer that is disposed between an input terminal and an output terminal, and a primary side switching circuit unit that converts voltage of the input terminal to AC voltage and provide the converted AC voltage to a primary side coil of the transformer. A secondary side switching circuit unit includes a plurality of switches that convert voltage induced in a secondary side coil of the transformer to DC voltage and provide the converted DC voltage to the output terminal. A controller is configured to adjust a short-circuit/open state of the plurality of switches based on voltages at both ends of each of the plurality of switches.

8 Claims, 4 Drawing Sheets

DC-DC CONVERTER SYSTEM FOR BLOCKING REVERSE POWERING

CROSS REFERENCE TO RELATED APPLICATION

The present application claims priority to Korean Patent Application No. 10-2017-0070915, filed Jun. 7, 2017, the entire contents of which is incorporated herein for all purposes by this reference.

BACKGROUND

1. Field of the Disclosure

The present disclosure relates to a direct current-direct current (DC-DC) converter system and, more particularly, to a DC-DC converter system capable of preventing unnecessary energy flow by blocking an energy reverse-powering phenomenon using a secondary side switch circuit unit of a converter. Accordingly, the durability of an auxiliary battery is protected and damage is prevented to an internal element of the converter.

2. Description of the Related Art

Typically, eco-friendly vehicles, including hybrid vehicles, electric vehicles, and fuel cell vehicles, have a low-voltage DC-DC converter (LDC) mounted therein instead of an alternator which supplies power to an electric field load of an internal combustion engine vehicle. Accordingly, the low voltage DC-DC converter (LDC) functions as the alternator. The LDC supplies power to the electric field load to prevent discharge of an auxiliary battery and charges the auxiliary battery when the voltage of the auxiliary battery decreases.

Generally, various LDCs topologies are known, and among them, an LDC to which a transformer is applied for insulation of input and output terminals is often used in a vehicle. When a transformer is applied to the LDC, a direct voltage is generated through a rectification operation on a secondary side (i.e., an output terminal side) of the transformer. In particular, a technique for improving a low-load efficiency has been proposed which includes providing a switch instead of a diode on a secondary side. However, in a conventional LDC having a switch instead of a diode on a secondary side may cause a reverse-powering phenomenon, in which energy is transmitted from an output terminal side to an input terminal side based on the surrounding electrical environment to occur when the switch is in a short-circuit state.

For example, when an output voltage of an LDC is less than voltage of an auxiliary battery, a reverse-powering phenomenon (e.g., a reverse-charge phenomenon), that transfers energy stored in the auxiliary battery to the LDC (e.g., a main battery), occurs. Accordingly, a problem may thus occur in the entire system due to the discharge of the auxiliary battery or damage to internal elements of power components of the LDC. Further, there the vehicle fuel economy is rapidly reduced due to the unnecessary energy transfer.

The above information disclosed in this section merely aims at improving understanding of the background of the present disclosure, and it should not be construed as acknowledgement that the description corresponds to a prior art known to those skilled in the art.

SUMMARY

The present disclosure provides a DC-DC converter system that may prevent unnecessary energy flow by blocking an energy reverse-powering phenomenon. Accordingly the durability of an auxiliary battery may be protected and damage to an internal element of a converter may be prevented.

According to an exemplary embodiment, the present disclosure provides a DC-DC converter system that may include a transformer disposed between an input terminal and an output terminal, a primary side switching circuit unit configured to convert voltage of the input terminal to AC voltage and provide the converted AC voltage to a primary side coil of the transformer, a secondary side switching circuit unit having a plurality of switches configured to convert voltage induced in a secondary side coil of the transformer to DC voltage and transmit the converted DC voltage to the output terminal and a controller configured to operate a short-circuit/open state of the plurality of switches based on voltages at a plurality of ends (e.g., both ends) of each of the plurality of switches.

In an exemplary embodiment of the present disclosure, the transformer may include a first secondary side coil and a second secondary side coil. The secondary side switching circuit unit may include a first secondary side switch that forms a current loop between the first secondary side coil and the output terminal and a second secondary side switch that forms a current loop between the second secondary side coil and the output terminal. The controller may be configured to operate the first secondary side switch and the second secondary side switches to cause voltages induced in the first secondary side coil and the second secondary side coil to be transmitted to an output terminal side in mutually opposite phases.

In some exemplary embodiment of the present disclosure, the controller may be configured to constantly open the first secondary side switch when current of a negative direction is transmitted to the output terminal in the current loop formed by the first secondary side switch, and constantly opens the second secondary side switch when current of a negative direction is transmitted to the output terminal in the current loop formed by the second secondary side switch. In an exemplary embodiment of the present disclosure, the controller may include a comparison unit configured to compare a predetermined reference value with each of a voltage difference between both ends of the first primary side switch and a voltage difference between both ends of the second primary side switch and the controller may be configured to constantly open the first primary side switch and the second primary side switch when the voltage difference between both ends is greater than the predetermined reference value based on a result of the calculation by the comparison unit.

In an exemplary embodiment of the present disclosure, the controller may include a calculation unit configured to generate a control signal that adjusts a short-circuit/open state of each of the first secondary side switch and the second secondary side switch of the secondary side switching circuit unit, based on the result of the calculation by the comparison unit and pulse width modulation signals of the first secondary side switch and the second secondary side switch. The pulse width modulation signals may be determined based on a pulse width modulation signal configured to generate the primary side switching circuit unit. In an exemplary embodiment of the present disclosure, the calculation unit may include a multiplexer having a first input terminal that receives one of the pulse width modulation signals of the first secondary side switch and the second secondary side switch a second input terminal that receives a result of the calculation by the comparison unit and a variable terminal coupled to the first input terminal.

In another aspect of the present disclosure, a DC-DC converter system may include a transformer disposed between an input terminal and an output terminal and has a primary side coil coupled to the input terminal, and a first secondary side coil and a second secondary side coil, each of which is coupled to the output terminal, a primary side switching circuit unit that is configured to convert voltage of the input terminal to AC voltage and transmit the converted AC voltage to the primary side coil of the transformer, a secondary side switching circuit unit having a first secondary side switch that forms a current loop between the first secondary side coil and the output terminal and a second secondary side switch that forms a current loop between the second secondary side coil and the output terminal. A controller may be configured to adjust an open/short-circuit state of the first secondary side switch and the second secondary side switch based on the direction of current that is transmitted through the plurality of current loops.

In an exemplary embodiment of the present disclosure, the controller may be configured to constantly open the first secondary side switch when current of a negative direction is transmitted to the output terminal in the current loop formed by the first secondary side switch and may be configured to constantly open the second secondary side switch when current of a negative direction is transmitted to the output terminal in the current loop formed by the second secondary side switch. In an exemplary embodiment of the present disclosure, the controller includes a comparison unit configured to compare a predetermined reference value with each of a voltage difference between both ends of the first primary side switch and a voltage difference between both ends of the second primary side switch, and the controller may be configured to constantly open the first primary side switch and the second primary side switch when the voltage difference between both ends is greater than the predetermined reference value based on a result of comparison by the comparison unit.

In an exemplary embodiment of the present disclosure, the controller may include a calculation unit configured to generate a control signal that adjusts a short-circuit/open state of each of the first secondary side switch and the second secondary side switch of the secondary side switching circuit unit, based on a result of a calculation by the comparison unit and pulse width modulation signals of the first secondary side switch and the second secondary side switch. The pulse width modulation signals may be determined based on a pulse width modulation signal for operating the primary side switching circuit unit. In an exemplary embodiment of the present disclosure, the calculation unit may include a multiplexer having a first input terminal configured to receive one of pulse width modulation signals of the first secondary side switch and the second secondary side switch a second input terminal configured to receive a result of the calculation by the comparison unit, and a variable terminal coupled with the first input terminal.

According to the DC-DC converter system, unnecessary energy flow may be prevented by blocking an energy reverse-powering phenomenon using a secondary side switching circuit unit of a converter. In particular, the durability of an auxiliary battery may be protected and damage to an internal element of the converter may be prevented. In other words, when the DC-DC converter system is applied to a converter control of a vehicle, production costs may be reduced by blocking an energy reverse-powering phenomenon without adding any additional hardware. The fuel efficiency of a vehicle may be improved by improvement of low-load energy efficiency compared to the conventional one, by replacing a diode with by a secondary side switching circuit unit.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Figure 1:
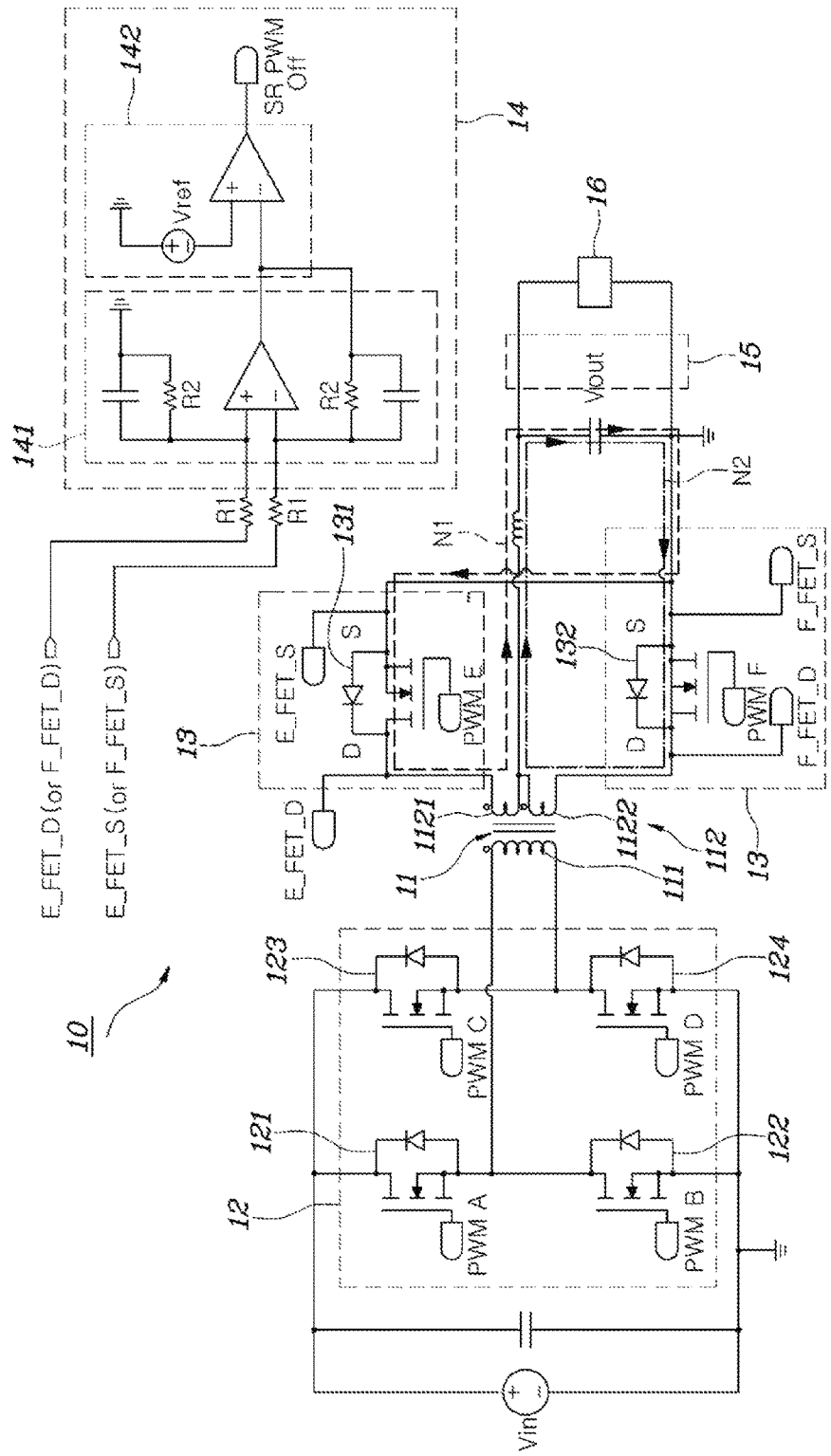
FIG. 1 is an exemplary circuit diagram of a DC-DC converter system according to an exemplary embodiment of the present disclosure.

While the invention will be described in conjunction with exemplary embodiments, it will be understood that present description is not intended to limit the invention to those exemplary embodiments. On the contrary, the disclosure is intended to cover not only the exemplary embodiments, but also various alternatives, modifications, equivalents and other exemplary embodiments, which may be included within the spirit and scope of the invention as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

Although an exemplary embodiment is described as using a plurality of units to perform the exemplary process, it is understood that the exemplary processes may also be performed by one or plurality of modules. Additionally, it is understood that the term controller/controller refers to a hardware device that includes a memory and a processor. The memory is configured to store the modules and the processor is specifically configured to execute said modules to perform one or more processes which are described further below. Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics sewer or a Controller Area Network (CAN).

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, a DC-DC converter system according to various exemplary embodiments of the present disclosure will be described in detail with reference to the accompanying drawings. In particular, in the following description, a low-voltage DC-DC converter applied to a vehicle will be described as an example.

FIG. 1 is an exemplary circuit diagram of a DC-DC converter system according to an exemplary embodiment of the present disclosure. Referring to FIG. 1, a DC-DC converter system 10 may include a transformer 11, a primary side switching circuit unit 12, a secondary side switching circuit unit 13, and a controller 14. The transformer 11 may be disposed between an input terminal and an output terminal of a converter and may include a primary side coil 111 and a secondary side coil 112. For example, the secondary side coil 112 may include a first secondary side coil 1121 and a second secondary side coil 1112. The transformer 11 may be configured to adjust a value of current or AC voltage using an electromagnetic induction phenomenon. Further, the primary side switching circuit unit 12 may be configured to convert voltage Vin of the input terminal of the converter to AC voltage and may transmit the converted AC voltage to the primary side coil 111 of the transformer 11. The primary side switching circuit unit 12 may be provided on a primary side of the transformer 11 and may include a plurality of switches controlled by respective pulse width modulation signals. Additionally, the plurality of switches may have various switching elements including a transistor.

For example, as illustrated in FIG. 1, the plurality of switches may include a first switch 121, a second switch 122, a third switch 123, and a fourth switch 124. The first switch 121 and the second switch 122 may be connected to each other in series, and the third switch 123 and the fourth switch 124 may be connected to each other in series. In particular, the first switch 121 and the second switch 122, which are connected to each other in series, may be connected in parallel with the third switch 123 and the fourth switch 124, which are connected to each other in series, the first switch 121 and the second switch 122, which are connected to each other in series, may be connected to a first end (e.g., dotted terminal) of the primary side coil 111 of the transformer 11, and the third switch 123 and the fourth switch 124, which are connected to each other in series, may be connected to a second end of the primary side coil 111 of the transformer 11. Accordingly, the voltage of the input terminal of the converter may be transmitted to the secondary side coil 112 through the primary side coil 111 of the transformer 11.

In particular, the first switch 121 may be operated (e.g., turned on/off) by a pulse width modulation (PWM) signal PWM A, the second switch 122 may be operated (e.g., turned on/off) by a pulse width modulation signal PWM B, the third switch 123 may be operated (e.g., turned on/off) by a pulse width modulation signal PWM C, and the fourth switch 124 may be operated (e.g., turned on/off) by a pulse width modulation signal PWM D. Further, the secondary side switching circuit unit 13 may be disposed between the output terminal and the secondary side coil 112 of the transformer 11 and may include a plurality of switches configured to convert voltage induced in the secondary side coil 112 of the transformer 11 to DC voltage to transmit the converted DC voltage to the output terminal of the converter.

For example, as illustrated in FIG. 1, the plurality of switches may include a first secondary side switch 131 and a second secondary side switch 132. The first secondary side switch 131 may be disposed between the first secondary side coil 1121 and the output terminal of the converter. The second secondary side switch 132 may be disposed between the second secondary side coil 1122 and the output terminal of the converter. Additionally, the plurality of switches 131 and 132 may have various switching elements including a transistor.

The secondary side switching circuit unit 13 may be configured to transmit voltages induced in the first secondary side coil 1121 and the second secondary side coil 1122 to an output terminal side of the converter in mutually opposite phases. More specifically, a first end (dotted terminal) of the first secondary side coil 1121 may be electrically connected to the first secondary side switch 131, the first secondary side switch 131 may be electrically connected to (−) of the output terminal, and the second end of the first secondary side coil 1121 may be electrically connected to (+) of the output terminal. Accordingly, a loop N1 may be formed by the first secondary side coil 1121. In the loop N1, when the current induced in the first secondary side coil 1121 is transmitted to the output terminal in a positive relation (e.g., in a direction of arrow "N1" illustrated in FIG. 1) may be referred to as forward-powering, and when the current induced in the first secondary side coil 1121 is transmitted to the output terminal in a negative relation (e.g., in a direction opposite the direction of arrow "N1" illustrated in FIG. 1) may be referred to as reverse-powering.

Further, a first end (dotted terminal) of the second secondary side coil 1122 may be electrically connected to (+) of the output terminal, (+) of the output terminal may be electrically connected to the second secondary side switch 132, and the second end of the second secondary side coil 1122 may be electrically connected to the second secondary side switch 132. Accordingly, a loop N2 may be formed by the second secondary side coil 1122. In the loop N2, when the current induced in the second secondary side coil 1122 is transmitted to the output terminal in a positive relation (e.g., in a direction of arrow "N2" illustrated in FIG. 1) may be referred to as forward-powering, and when the current induced in the second secondary side coil 1122 is transmitted to the output terminal in a negative relation (e.g., in a direction opposite the direction of arrow "N2" illustrated in FIG. 1) may be referred to as reverse-powering.

For example, in the circuit diagram showing the converter system of the present disclosure, forward-powering (N1)

refers to a state in which the voltage induced in the first secondary side coil 1121 through the primary side coil 111 of the transformer 11 is converted to DC voltage, and current may be transmitted via a capacitor of the output terminal of the converter to the first secondary side switch 131, as illustrated in FIG. 1. Further, in the circuit diagram showing the converter system of the present disclosure, forward-powering (N2) refers to a state in which the voltage induced in the second secondary side coil 1122 through the primary side coil 111 of the transformer 11 is converted to DC voltage, and current may be transmitted via the capacitor of the output terminal of the converter to the second secondary side switch 132, as illustrated in FIG. 1.

In particular, when forward-powering N1 and N2 is performed, current may be transmitted from the input terminal of the converter to the output terminal of the converter and power may thus be supplied to an auxiliary battery 15 or a load 16. Conversely, reverse-powering, which corresponds to a state opposite to forward-powering N1 and N2, refers to a state in which current may be transmitted reversely from the output terminal of the converter to the input terminal of the converter, and refers to current that may be transmitted in a direction opposite the direction of flow of forward-powering current N1 and N2, illustrated in FIG. 1.

Further, the controller 14 may be configured to enable DC voltage to be applied to the output terminal by operating the switches 131 and 132 of the secondary side switching circuit unit 13. Specifically, the controller 14 may be configured to perform PWM-control of the switches 131 and 132 of the secondary side switching circuit unit 13 based on PWM signals that operate the switches 121, 122, 123, and 124 of the primary side switching circuit unit 12. This is illustrated in detail in FIG. 2.

Figure 2:
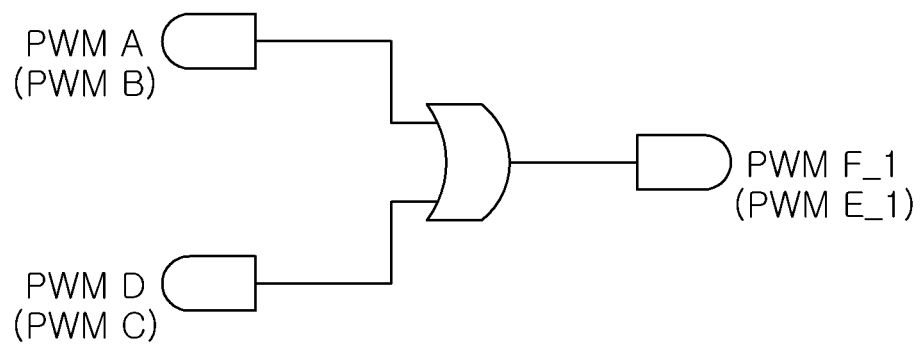
FIG. 2 and FIG. 3 are exemplary diagrams illustrating a logic circuit applied to generation of a pulse width modulation signal of a secondary side switching circuit unit based on a pulse width modulation signal of a primary side switching circuit unit, in the DC-DC converter system according to the exemplary embodiment of the present disclosure illustrated in FIG. 1.
Figure 3:
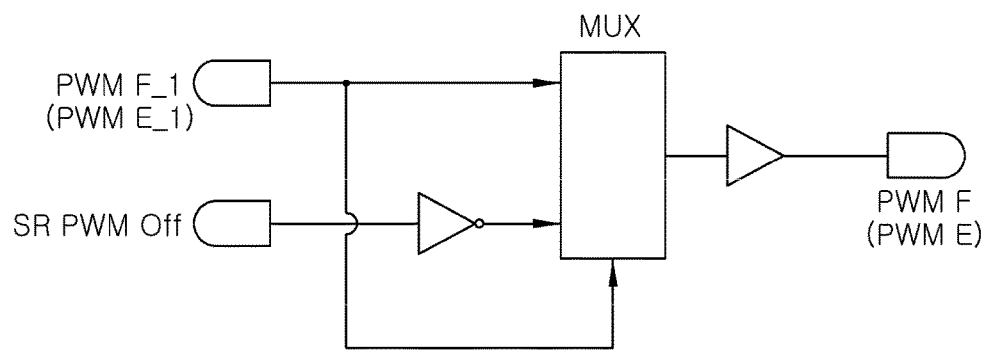

FIG. 2 and FIG. 3 are exemplary diagrams illustrating a logic circuit applied to generation of a pulse width modulation signal of a secondary side switching circuit unit based on a pulse width modulation signal of a primary side switching circuit unit, in the DC-DC converter system according to the exemplary embodiment of the present disclosure illustrated in FIG. 1. Referring to FIG. 2, the controller 14 may be configured to calculate (e.g., determine) a result, obtained by inputting, to an OR gate, PWM signals of the first switch 121 and the fourth switch 124 of the primary side switching circuit unit 12, to be a PWM signal of the second secondary side switch 132 of the secondary side switching circuit unit 13. Likewise, the controller 14 may be configured to calculate a result, which is obtained by inputting, to the OR gate, PWM signals of the second switch 122 and the third switch 123 of the primary side switching circuit unit 12, to be a PWM signal of the first secondary side switch 131 of the secondary side switching circuit unit 13.

Additionally, as described above, in a procedure of determining the PWM signal of the switches 131 and 132 of the secondary side switching circuit unit 13, the controller 14 may be configured to block reverse-powering by opening (e.g., turning off) the switches 131 and 132 when the reverse-powering occurs. Specifically, when voltage of a first end of the switch of the secondary side switching circuit unit 13, which is connected to the output terminal of the converter, is greater than voltage of the second end connected to the secondary side coil 112, the controller 14 may be configured to block a reverse-powering phenomenon by constantly turning off the corresponding switch.

When voltage of the first end of the switch of the secondary side switching circuit unit 13, which is connected to the output terminal of the converter, is less than voltage of the second end connected to the secondary side coil 112, the controller 14 may be configured to normally PWM-operate the corresponding switch. The controller 14 may be configured to measure the voltage between the two ends of the switch of the secondary side switching circuit unit 113 to block reverse-powering. When voltage of the auxiliary battery 15, that is, voltage of the first end of the switch of the secondary side switching circuit unit 13 connected to the output terminal of the converter is greater than voltage of the second end connected to the secondary side coil 112, the energy stored in the auxiliary battery 15 may be transferred to the secondary side coil 112 through the plurality of switches 131 and 132 of the secondary side switching circuit unit 13. Additionally, the voltage may be induced in the primary side coil 111 from the secondary side coil 112 to enable a reverse-powering phenomenon that may transmit current to the primary side switching circuit unit 12.

Accordingly, when a reverse-powering phenomenon occurs, the energy stored in the auxiliary battery 15 may be transferred to the main battery through the secondary side coil and the primary side coil of the transformer. The auxiliary battery 15 may be discharged and a durability problem t may occur and the entire converter system or an internal element of the converter may be damaged. In addition, when a reverse-powering phenomenon occurs in the converter of the vehicle the energy stored in the auxiliary battery 15 may be transferred to the main battery and unnecessary energy transfer may reduce the fuel efficiency of the vehicle. Therefore, when voltage of the first end of the switch of the secondary side switching circuit unit 13 which is connected to the output terminal of the converter is greater than voltage of the second end connected to the secondary side coil 112, the controller 14 may be configured to block a reverse-powering phenomenon by operating the switch of the secondary side switching circuit unit 13, that is, constantly turning off the corresponding switch.

As illustrated in FIG. 1, the controller 14 may include an amplification unit 141, a comparison unit 142, and a calculation unit (not illustrated) to operate a plurality of switches 131 and 132 of the secondary side switching circuit unit 13. The controller 14 may be electrically connected to the first secondary side switch 131 of the secondary side switching circuit unit 13, and although not illustrated in the drawing, may also be electrically connected to the second secondary side switch 132 of the secondary side switching circuit unit 13.

The amplification unit 141 may be configured to amplify a voltage difference between both ends of the first secondary side switch 131 and a voltage difference between both ends of the second secondary side switch 132. For example, the amplification unit 141 may include an amplification circuit implemented as a differential amplifier as illustrated in FIG. 1. In particular, the differential amplifier may be configured to amplify a voltage difference between an inverting input terminal and a non-inverting input terminal. Voltage of a source terminal of the transistor E_FET S and F_FET S may be input to the inverting input terminal of the differential amplifier, and voltage of a drain terminal of the transistor E_FET D and F_FET D may be input to a non-inverting input terminal of the differential amplifier.

Internal resistance between the drain of the transistor E_FET D and F_FET D and the source of the transistor E_FET S and F_FET S may have a reduced value in units of [mΩ], and the voltage across the drain terminal of the transistor E_FET D and F_FET D and the source terminal of the transistor E_FET S and F_FET S may thus have a reduced value. Therefore, when the controller 14 is unable to provide the low voltage across the drain terminal of the transistor E_FET D and F_FET D and the source terminal of the transistor E_FET S and F_FET S directly to the comparison unit 142, the controller 14 may be configured to amplify the voltage through the amplification unit 141 and then transmit the amplified voltage to the comparison unit 142.

The comparison unit 142 may be configured to compare a value amplified by the amplification unit 141 with a predetermined reference value. For example, the comparison unit 142 may include a circuit implemented as a comparator whose non-inverting input terminal may be grounded, as illustrated in FIG. 1. The comparison unit 142 may be configured to operate in an active low state. For example, when a voltage less than the reference voltage Vref is input to the input terminal of the comparison unit 142, the output terminal of the comparison unit 142 may be configured to output a voltage having a value that corresponds to HIGH. Conversely, when a voltage greater than the reference voltage Vref is input to the input terminal of the comparison unit 142, the output terminal of the comparison unit 142 may be configured to output voltage (0V or a ground level) having a value that corresponds to LOW.

A signal output from the comparison unit 142 may be a reference signal SR PWM Off which is capable of determining whether reverse-powering occurs. The reference voltage Vref used by the comparison unit 142 may be a value that is compared with a value obtained by amplifying voltages at both ends of the switches 131 and 132 and may be a minimum value capable of determining reverse-powering. The controller 14 configured as described above may be configured operate as follows. In a case of the loop N1 when current is transmitted through the first secondary switch 131, when the first secondary side switch 131 is turned on, forward-powering may be performed when current is transmitted from a source S to a drain D of the first secondary side switch 131. When voltage of the output terminal (e.g., voltage of the auxiliary battery) Vout is greater than voltage induced in the first secondary side coil 1121, when the first secondary side switch 131 is turned on, current is transmitted from the drain D to the source S of the first secondary side switch 131 and reverse-powering may occur.

When current is transmitted due to reverse-powering, a voltage may be applied between the drain D and the source S of the first secondary side switch 131 by internal resistance between the drain D and the source S of the first secondary side switch 131. The applied voltage may be amplified by the amplification unit 141. The drain D of the first secondary side switch 131 may be connected with the non-inverting input terminal of the amplification unit 141 that may be implemented as the differential amplifier, the source S of the first secondary side switch 131 may be connected with the inverting input terminal of the amplification unit 141, and the output of the amplification unit 141 may have a positive value. The output value of the amplification unit 141 may be compared with the reference voltage Vref by the comparison unit 142. When the output value of the amplification unit 141 is greater than a value of the reference voltage Vref, the comparison unit 142 configured to operate in an active low state may be configured to output a value corresponding to LOW (0V or a ground level).

Further, when the loop N2, in which current is transmitted through the second secondary side switch 132, when the second secondary side switch 132 is turned on, forward-powering may be performed when current is transmitted from a source S to a drain D of the second secondary side switch 132. When voltage of the output terminal (e.g., voltage of the auxiliary battery) Vout is greater than the voltage induced in the first secondary side coil 1121, when the second secondary side switch 132 is turned on, current may be transmitted from the drain D to the source S of the second secondary side switch 132, and reverse-powering may occur.

When current is transmitted due to reverse-powering, a voltage may be applied between the drain D and the source S of the second secondary side switch 132 by internal resistance between the drain D and the source S of the second secondary side switch 132. The applied voltage may be amplified by the amplification unit 141. Since the drain D of the second secondary side switch 132 is connected with the non-inverting input terminal of the amplification unit 141, which is implemented as the differential amplifier and the source S of the second secondary side switch 132 is connected with the inverting input terminal of the amplification unit 141 an output of the amplification unit 141 may have a positive value. The output value of the amplification unit 141 may be compared with the reference voltage Vref by the comparison unit 142. When the output value of the amplification unit 141 is greater than a value of the reference voltage Vref, the comparison unit 142 which operates in an active low state may be configured to output a value corresponding to LOW (0V or a ground level).

The calculation unit (not illustrated) may be configured to generate control signals PWM E and PWM F that control on/off (short-circuit/open) states of the plurality of switches 131 and 132 of the secondary side switching circuit unit 13, respectively, based on a comparison result of the comparison unit 142 and pulse width modulation signals for the plurality of switches 131 and 132 of the secondary side switching circuit unit 13, which are determined based on a pulse width modulation signal for controlling the primary side switching circuit unit 12.

Figure 4:
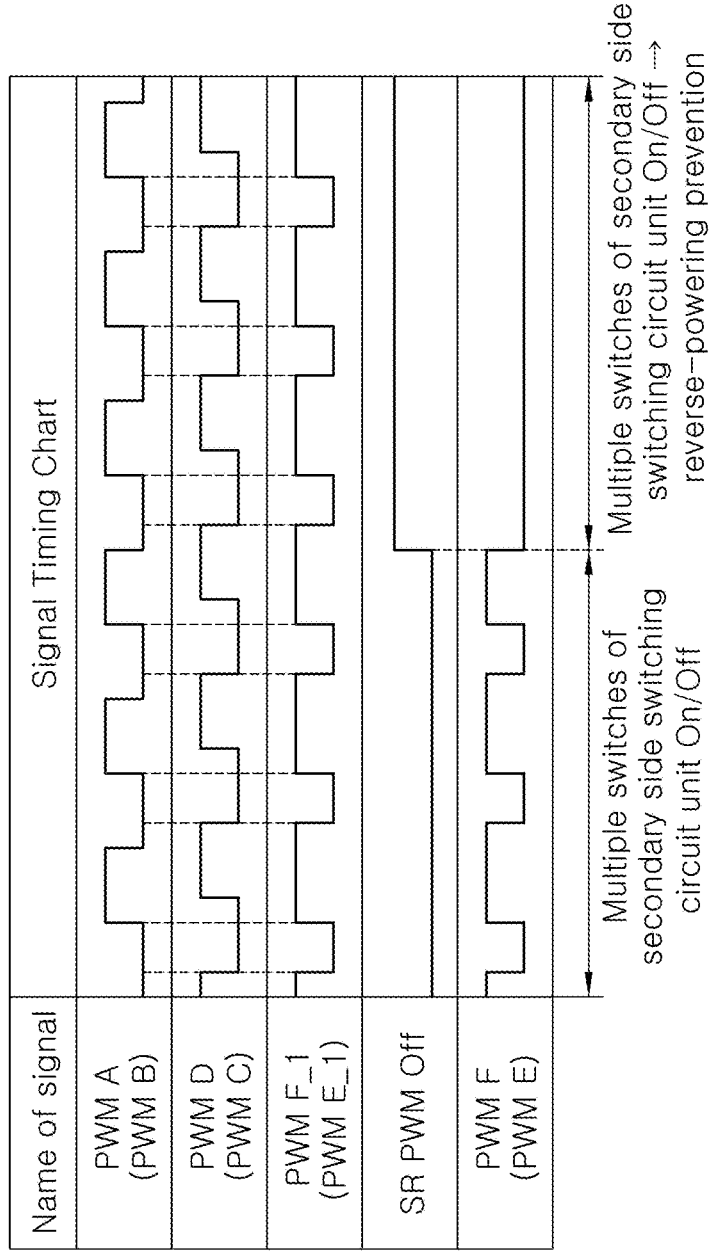
FIG. 4 is an exemplary waveform diagram illustrating signal waveforms of respective nodes shown in FIG. 1 to FIG. 3 accordingly to the exemplary embodiment of the present disclosure.

Hereinafter, operation of the calculation unit will be described in more detail with reference to FIG. 2 to FIG. 4. FIG. 4 is an exemplary waveform diagram illustrating signal waveforms of respective nodes shown in FIG. 1 to FIG. 3. First, referring to FIG. 2, the calculation unit may be configured to generate respective pulse width modulation signals for the first secondary side switch 131 and the second secondary side switch 132 of the secondary side switching circuit unit 13, according to a pulse width modulation signal configured to control the primary side switching circuit unit 12. For example, as illustrated in FIG. 2 and FIG. 4, the calculation unit may be configured to generate a pulse width modulation signal PWM F_1 with respect to the second secondary side switch 132 of the secondary side switching circuit unit 13 by inputting to the OR gate, the pulse width modulation signal PWM A having a predetermined duty to operate the first switch 121 of the primary side switching circuit unit 12 and the pulse width modulation signal PWM D having a predetermined duty to operate the fourth switch 124 of the primary side switching circuit unit 12.

Further, as illustrated in FIG. 2 and FIG. 4, the calculation unit may be configured to generate a pulse width modulation signal PWM E_1 with respect to the first secondary side switch 131 of the secondary side switching circuit unit 13 by inputting to the OR gate, the pulse width modulation signal PWM B having a predetermined duty to operate the second switch 122 of the primary side switching circuit unit 12 and the pulse width modulation signal PWM C having a predetermined duty to operate the third switch 123 of the primary side switching circuit unit 12. For example, the OR gate may output "HIGH" when one of inputs or all inputs are "HIGH", and may output "LOW" when one of inputs or all inputs are "LOW". Therefore, the pulse width modulation signals PWM E_1 and PWM F_1 with respect to the first secondary side switch 131 and the second secondary side switch 132 may have a signal band that corresponds to the sum of all the signal bands input to the OR gate.

Referring to FIG. 3, the calculation unit may be configured to generate a signal that operates the second secondary side switch 131 and the second secondary side switch 132 of the secondary side switching circuit unit 13, through a multiplexer MUX. For example, the multiplexer MUX may include a first input terminal, a second input terminal, and a variable terminal. One of the pulse width modulation signals PWM F_1 and PWM E_1 of the first secondary side switch 131 and the second secondary side switch 132 is input to the first input terminal. A comparison result of the comparison unit 142, (e.g., a reference signal SR PWM Off) may be input to the second input terminal and the variable terminal may be electrically connected with the first input terminal to perform input.

Accordingly, the calculation unit may be configured to generate, using the multiplexer MUX, the pulse width modulation signal PWM F. In other words, a control signal is configured to operate the second secondary side switch 132 of the secondary side switching circuit unit 13 by outputting a value that corresponds to LOW of the pulse width modulation signal PWM F_1 of the second secondary side switch 132 when an input to the first input terminal connected to the variable terminal, which is the pulse width modulation signal PWM F_1 of the second secondary side switch 132 has the value corresponding to LOW and outputting an inverted value of the reference signal SR_PWM_Off, (e.g., a comparison result of the comparison unit 142) when the pulse width modulation signal PWM F_1 of the second secondary side switch 132 has a value corresponding to HIGH.

Further, the calculation unit may be configured to generate using the multiplexer MUX the pulse width modulation signal PWM E, that is a control signal configured to operate the first secondary side switch 131 of the secondary side switching circuit unit 13 by outputting a value corresponding to LOW of the pulse width modulation signal PWM E_1 of the first secondary side switch 131 when an input to the first input terminal connected to the variable terminal, which is the pulse width modulation signal PWM E_1 of the first secondary side switch 131, has the value corresponding to LOW and outputting an inverted value of the reference signal SR_PWM_Off, (i.e., a comparison result of the comparison unit 142) when the pulse width modulation signal PWM E_1 of the first secondary side switch 131 has a value corresponding to HIGH.

For example, the control signals, (i.e., the pulse width modulation signals PWM E and PWM F), which operate the first secondary side switch 131 and the second secondary side switch 132 of the secondary side switching circuit unit 13, may be determined based on a result of a calculation performed by the comparison unit 142 that corresponds to an operation state of the reference signal SR_PWM_Off. The control signals PWM E and PWM F that operate the first secondary side switch 131 and the second secondary side switch 132 of the secondary side switching circuit unit 13 may operate the first secondary side switch 131 and the second secondary side switch 132 using the pulse width modulation signals PWM E_1 and PWM F_1 as switch control signals with respect to the first secondary side switch 131 and the second secondary side switch 132 of the secondary side switching circuit unit 13, respectively, when the reference signal SR PWM Off of the comparison unit 142 has a value that corresponds to LOW. Conversely, the control signals PWM E and PWM F that operate the first secondary side switch 131 and the second secondary side switch 132 of the secondary side switching circuit unit 13 may block energy reverse-powering by constantly turning off the first secondary side switch 131 and the second secondary side switch 132 of the secondary side switching circuit unit 13 when the reference value SR PWM Off of the comparison unit 142 has a value that corresponds to HIGH.

As described above, an exemplary embodiment of the present disclosure may prevent unnecessary energy flow by blocking an energy reverse-powering phenomenon by using a secondary side switch circuit unit of a converter. Accordingly, the durability of an auxiliary battery may be protected and damage to an internal element of the converter may be prevented. In particular, when an exemplary embodiment of the present disclosure is applied to a converter control of a vehicle, production costs may be reduced by blocking an energy reverse-powering phenomenon without adding any additional hardware. The fuel efficiency of a vehicle may also be improved by enhancement of low-load energy efficiency compared to the conventional approach by replacing a diode with by a secondary side switching circuit unit.

Descriptions relating to specific exemplary embodiments of the present disclosure have been provided hereinabove, but it will be apparent to those skilled in the art that various modifications and variations of the present disclosure may be made without departing from the spirit of the present disclosure which is provided by the following claims.

What is claimed is:

1. A direct current-direct current (DC-DC) converter system, comprising:
   a transformer disposed between an input terminal and an output terminal;
   a primary side switching circuit unit configured to convert voltage of the input terminal to alternating current (AC) voltage and transmit the converted AC voltage to a primary side coil of the transformer;
   a secondary side switching circuit unit having a first secondary side switch and a second secondary side switch configured to convert voltage induced in a first secondary side coil and a second secondary side switch of the transformer to DC voltage and transmit the converted DC voltage to the output terminal; and
   a controller configured to adjust a short-circuit/open state of the first secondary side switch and the second secondary side switch based on voltages at both ends of each of the plurality of switches, wherein
   the first secondary side switch forms a current loop between the first secondary side coil and the output terminal, and the second secondary side switch forms a current loop between the second secondary side coil and the output terminal,
   the controller is configured to operate the first secondary side switch and the second secondary side switch to supply voltages induced in the first secondary side coil and the second secondary side coil to an output terminal side in mutually opposite phases, and
   the controller includes a comparison unit configured to compare a predetermined reference value with each of a voltage difference between both ends of the first secondary side switch and a voltage difference between both ends of the second secondary side switch, and wherein the controller is configured to constantly open the first secondary side switch and the second secondary side switch when the voltage difference between both ends is greater than the predetermined reference value according to a result of comparison performed by the comparison unit.

2. The DC-DC converter system of claim 1, wherein the controller is configured to constantly open the first secondary side switch when current of a negative direction is transmitted to the output terminal in the current loop formed by the first secondary side switch, and to constantly open the second secondary side switch when current of a negative direction is transmitted to the output terminal in the current loop formed by the second secondary side switch.

3. The DC-DC converter system of claim 1, wherein the controller includes a calculation unit configured to generate a control signal that operate a short-circuit/open state of each of the first secondary side switch and the second secondary side switch of the secondary side switching circuit unit, based on a result of comparison performed by the comparison unit and pulse width modulation signals of the first secondary side switch and the second secondary side switch, and wherein the pulse width modulation signals are determined based on a pulse width modulation signal for operating the primary side switching circuit unit.

4. The DC-DC converter system of claim 3, wherein the calculation unit includes:
   a multiplexer having a first input terminal that receives one of pulse width modulation signals from the first secondary side switch and the second secondary side switch,
   a second input terminal that receives a comparison result performed by the comparison unit, and
   a variable terminal connected with the first input terminal.

5. A DC-DC converter system, comprising:
   a transformer disposed between an input terminal and an output terminal and having a primary side coil coupled to the input terminal, and a first secondary side coil and a second secondary side coil, each coupled to the output terminal;
   a primary side switching circuit unit configured to convert voltage of the input terminal to alternating current (AC) voltage and transmit the converted AC voltage to the primary side coil of the transformer;
   a secondary side switching circuit unit having a first secondary side switch that forms a current loop between the first secondary side coil and the output terminal, and a second secondary side switch that forms a current loop between the second secondary side coil and the output terminal; and
   a controller configured to adjust an open/short-circuit state of the first secondary side switch and the second secondary side switch, based on a direction of current flowing through the current loops, wherein
   the controller includes a comparison unit configured to compare a predetermined reference value with each of a voltage difference between both ends of the first secondary side switch and a voltage difference between both ends of the second secondary side switch, and
   the controller is configured to constantly open the first secondary side switch and the second secondary side switch when the voltage difference between both ends is greater than the predetermined reference value based on a comparison performed by the comparison unit.

6. The DC-DC converter system of claim 5, wherein the controller is configured to constantly open the first secondary side switch when current of a negative direction is transmitted to the output terminal in the current loop formed by the first secondary side switch, and to constantly open the second secondary side switch when current of a negative direction is transmitted to the output terminal in the current loop formed by the second secondary side switch.

7. The DC-DC converter system of claim 5, wherein the controller includes:
   a calculation unit configured to generate a control signal that adjust a short-circuit/open state of each of the first secondary side switch and the second secondary side switch of the secondary side switching circuit unit, based on a result of comparison performed by the comparison unit and pulse width modulation signals of the first secondary side switch and the second secondary side switch, wherein the pulse width modulation signals are determined based on a pulse width modulation signal for operating the primary side switching circuit unit.

8. The DC-DC converter system of claim 7, wherein the calculation unit includes:
   a multiplexer having a first input terminal that receives one of pulse width modulation signals of the first secondary side switch and the second secondary side switch;
   a second input terminal that receives a result of comparison performed by the comparison unit; and
   a variable terminal connected with the first input terminal.

* * * * *